H. M. SHARP.
APPARATUS FOR ANALYZING FLUE GASES.
APPLICATION FILED MAY 6, 1918.
1,299,865.
Patented Apr. 8, 1919.
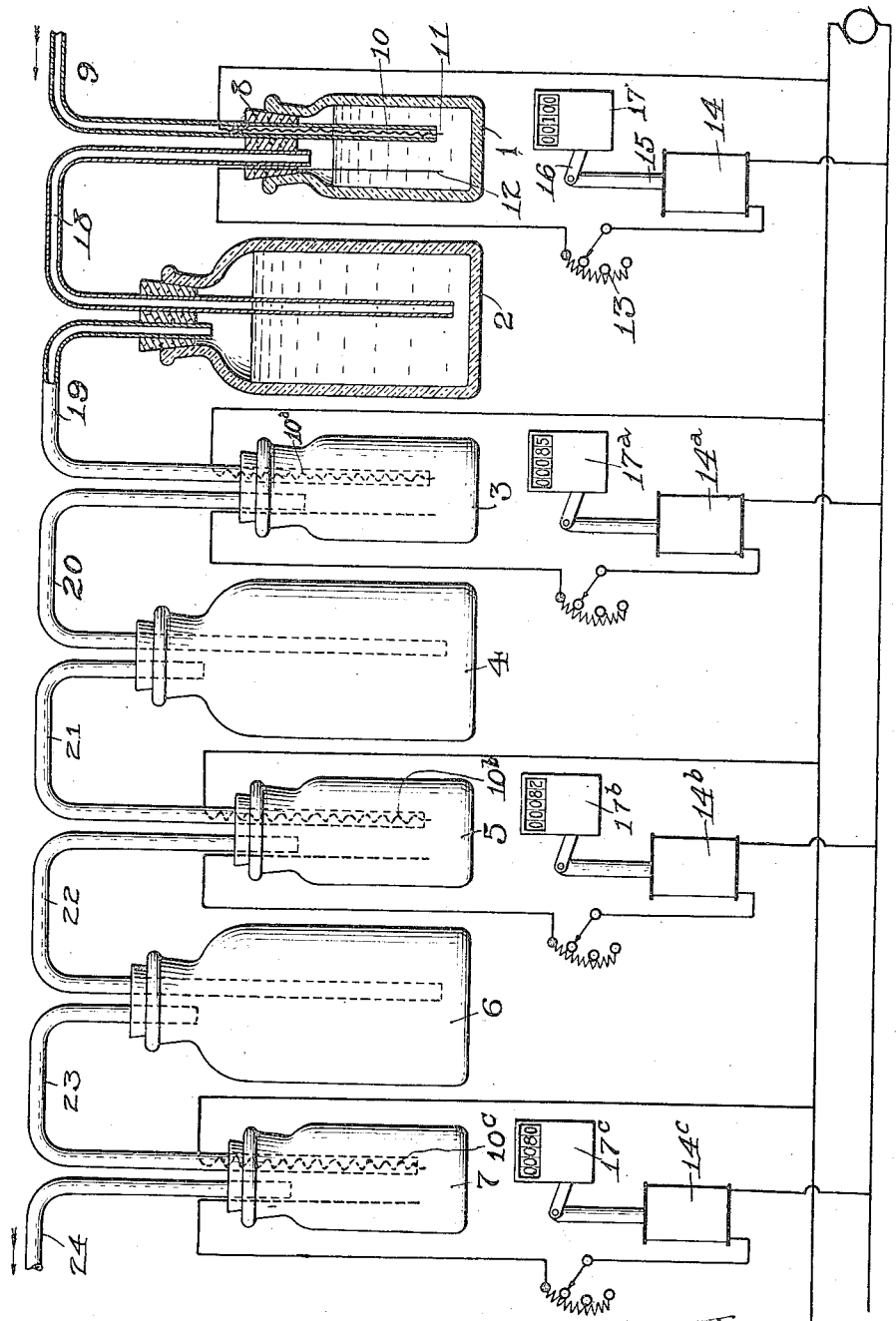
Inventor
Herbert M. Sharp,
by Geyer & Popp
Attorneys.

UNITED STATES PATENT OFFICE.

HERBERT M. SHARP, OF BUFFALO, NEW YORK.

APPARATUS FOR ANALYZING FLUE-GASES.

1,299,865.   Specification of Letters Patent.   Patented Apr. 8, 1919.

Application filed May 6, 1918. Serial No. 232,920.

*To all whom it may concern:*

Be it known that I, HERBERT M. SHARP, a citizen of the United States, residing at Buffalo, in the county of Erie and State of New York, have invented new and useful Improvements in Apparatus for Analyzing Flue-Gases, of which the following is a specification.

This invention relates to the class of apparatus employed for testing or analyzing flue-gases, and although the same is more particularly designed for this purpose it is also useful for analyzing various other gases, such as producer gases and blast furnace gases.

It is generally recognized that a chemical analysis of flue gases is most important in order that the operating conditions of the furnace or other heating apparatus may be intelligently varied to secure as nearly perfect combustion as possible and effect a corresponding economy in fuel consumption.

The object of my invention is the provision of an inexpensive analyzing apparatus of this character which shall be simple in construction and accurate and reliable in operation.

The accompanying drawing represents a simple embodiment of the invention in diagrammatic form, suitable for determining the percentage of carbon dioxid, carbon monoxid and oxygen in flue gases.

The apparatus comprises a series of bottles or receptacles 1—7, those numbered 1, 3, 5 and 7 being conveniently termed electrolyte receptacles and the remaining ones absorbing vessels. Each of the receptacles 3, 5 and 7 is filled with a suitable electrolyte, as water slightly acidulated with sufuric acid or containing a little salt to render it conductive. Through the stopper 8 of the first receptacle 1 passes a glass gas inlet tube or conduit 9 adapted to be connected with the flue and extending nearly to the bottom of the receptacle. Preferably arranged within this tube is a conducting wire or electrode 10 which terminates slightly beyond the lower end of the tube, as shown at 11, this projecting end being accurately centered therein. Another electrode 12 is sealed in and passes through the stopper, both electrodes being immersed in the contents of the receptacle. These electrodes are included in an electric circuit which also contains a rheostat 13 and a solenoid or other electro-magnet 14 connected in series. An alternating current source, such as the ordinary house lighting circuit, is suitable for the purpose. The core or plunger 15 of the solenoid is adapted to operate an indicator or recorder of any suitable construction. In the drawings it is connected to the actuating member 16 of an ordinary counter 17.

The remaining electrolyte receptacles 3, 5 and 7, are identical in construction with the receptacle 1, their electrodes being included in separate electric circuits containing solenoids $14^a$, $14^b$, $14^c$ and counters $17^a$, $17^b$, $17^c$, respectively.

As shown, the absorbing vessels 2, 4 and 6 alternate with the electrolyte receptacles and the several vessels and receptacles are connected in series by glass tubes or other suitable conduits 18 to 23, respectively, the short legs of which pass through the stoppers of the absorbing vessels while their long legs pass through the stoppers of the electrolyte receptacles and contain the electrodes $10^a$, $10^b$, $10^c$ corresponding to the electrode 10. The final electrolyte receptacle 7 has a gas discharge tube 24.

Any suitable means may be employed for drawing a sample of the gas to be tested from the flue and passing it through the several units of the apparatus. This may be accomplished, for instance, by a water siphon or electric pump, not shown, connected to the initial gas inlet tube 9, and a similar siphon connected to the final gas discharge tube 24.

The several vessels 2, 4, 6 contain appropriate re-agents for absorbing different constituents of the flue-gas; for instance, the vessel 2 contains a re-agent to absorb carbon dioxid, the vessel 4 a re-agent to absorb oxygen and the vessel 6 a re-agent to absorb carbon monoxid.

In the use of the apparatus, the gas emerging from the tube 9 at 11, forms a bubble which presses the electrolyte away from the electrode 10, breaking the corresponding electric circuit. Ordinarily, when there is no bubble at that point, both electrodes 10 and 12 are immersed in the electrolyte which therefore conducts the current from one electrode to the other, completing the circuit and exciting the solenoid 14. This causes the descent of the core 15 which in turn operates the counter 17, thus registering or recording a point every time a bubble emerges from the tube 9. In like manner, the counters $17^a$, $17^b$, $17^c$ register the number of bubbles issuing from the inlet tubes of the remaining electrolyte receptacles.

The gas entering at 9 contains $CO_2$, $O_2$, $CO_2$ and $N_2$. When it passes through the receptacle 1, the number of bubbles initially used is registered by the corresponding counter. The gas then bubbles through the liquid in the first absorbing vessel 2, where the $CO_2$ is removed. The remaining gas consisting of $O_2$, CO and $N_2$ passes into the next electrolyte receptacle 3, the number of bubbles entering the same being registered by the counter $17^a$. The gas then passes into the absorbing vessel 4, where the re-agent removes the $O_2$. The remainder consisting of CO and $N_2$ next enters the electrolyte receptacle 5 and thence passes through the last absorbing vessel 6 where the CO is removed. Finally the rest of the gas passes through the last electrolyte receptacle 7, the number of bubbles issuing from the inlet tube of this receptacle representing the nitrogen content of the gas.

The long gas inlet tubes of the several electrolyte receptacles should all have the same internal diameter, so as to form bubbles of uniform size.

Let it be assumed that all of the counters are turned to zero, and that for convenience of calculation, the apparatus is run until the first counter 17 registers 100 bubbles. It may then be said that there are 100 parts of gas to begin with. If there is any $CO_2$ present, it will be absorbed in the vessel 2. Say, it contains 15 per cent. of $CO_2$, then fifteen parts or bubbles will be removed in the vessel 2, leaving 85 parts in the gas which passes into the second electrolyte receptacle 3. The counter $17^a$ of the latter therefore registers only 85, while the counter 17 registers 100. Similarly, all the oxygen in the gas is absorbed in the vessel 4. If it amounts to, say 3 per cent., the counter $17^b$ of the next electrolyte receptacle 5 will register 82, the difference between the readings of the counters $17^a$ and $17^b$ thus showing the quantity of oxygen absorbed. Likewise all CO is absorbed in the vessel 6, the difference between the readings of counters $17^b$ and $17^c$ showing the percentage of CO, which is assumed to be 2 per cent. in the example illustrated in the drawings.

The percentage composition of the gas is determined in this manner, no matter how many bubbles are registered by the initial counter 17 between sets of readings.

The embodiment of the invention herein shown and described is only an example thereof in a comparatively simple form. It may be modified in various details within the scope of the appended claims, and I do not therefore wish to be limited to the particular construction illustrated in the drawings. For instance, other registering or recording devices could be substituted for the counters herein shown, and the terms "indicator" and "indicating" means used in some of the claims are intended to include such equivalent appliances.

It is also obvious that the units of the apparatus may be increased or reduced to test gases as to the presence and quantity of a greater or less number of constituents.

I claim as my invention:

1. In an apparatus for analyzing gases, an electric circuit, a receptacle for conductive liquid, electrodes included in said circuit and arranged within said receptacle, and a gas-conduit discharging the gas into said conductive liquid to displace the liquid relatively to an electrode of said circuit and control the latter.

2. In an apparatus for analyzing gases, an electric circuit, a receptacle for conductive liquid, electrodes included in said circuit and arranged within said receptacle, a gas-conduit discharging the gas into said conductive liquid to displace the liquid relatively to an electrode of said circuit and control the latter, and indicating means controlled by said circuit.

3. In an apparatus for analyzing gases, an electric circuit, a receptacle for conductive liquid, electrodes included in said circuit and submerged in the liquid of said receptacle, a gas conduit arranged to deliver the gas into said liquid and past one of the electrodes, whereby the gas-bubbles emerging from said conduit press the conductive liquid away from said electrode and interrupt the circuit, and means controlled by said circuit for indicating the number of its interruptions.

4. In an apparatus for analyzing gases, an electric circuit, a receptacle for conductive liquid, electrodes included in said circuit and submerged in the liquid of said receptacle, a gas conduit leading into said receptacle and arranged to deliver the gas so as to change the medium in contact with the electrode, an electro-magnet included in said circuit, and an indicator controlled by said magnet.

5. In an apparatus for analyzing gases, an electric circuit, a receptacle for conductive liquid, electrodes included in said circuit and submerged in the liquid of said receptacle, a gas conduit leading into said receptacle and inclosing one of said electrodes, the end of the latter being located at the discharge end of said conduit, and an indicator controlled by said circuit.

6. An apparatus for analyzing gases, comprising a plurality of receptacles for conductive liquid, an electric circuit for each receptacle, each of said receptacles having electrodes submerged therein and included in the corresponding circuit, a gas conduit for each receptacle arranged to deliver the gas so as to change the medium in contact with the electrode, indicating means for each receptacle controlled by its circuit, and a gasabsorber interposed between said liquid receptacles and communicating therewith.

7. An apparatus for analyzing gases, comprising a plurality of receptacles for conductive liquid, an electric circuit for each of the same, each receptacle containing a gas conduit discharging into its liquid and electrodes submerged in the liquid and included in the corresponding circuit, one of the electrodes of each receptacle being arranged within the corresponding gas-conduit and terminating at the discharge end of the conduit, indicators respectively controlled by said circuits, and gas-absorbing vessels alternating with said receptacles and communcating therewith.

HERBERT M. SHARP.